Aug. 29, 1967

Z. SHAPIRO 3,339,077

POWER GENERATING APPARATUS INCLUDING A THERMALLY ACTUABLE PRIME MOVER

Filed June 3, 1963

United States Patent Office
3,339,077
Patented Aug. 29, 1967

3,339,077

POWER GENERATING APPARATUS INCLUDING A THERMALLY ACTUABLE PRIME MOVER

Zalman Shapiro, Pittsburgh, Pa., assignor to Nuclear Materials and Equipment Corporation, Apollo, Pa., a corporation of Pennsylvania Filed June 3, 1963, Ser. No. 285,106
7 Claims. (Cl. 290—1)

Figure 1:
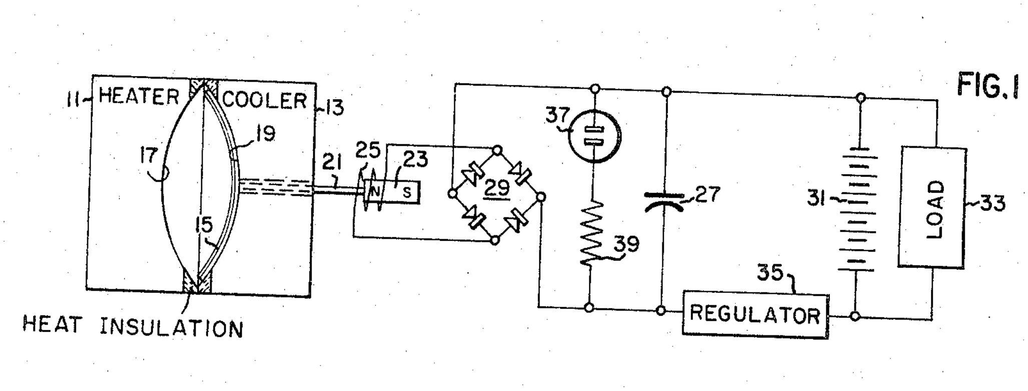

This invention relates to power generation and has particular relationship to the generation of power for use in areas where there are no power facilities available. It is an object of this invention to provide generating apparatus of simple and reliable structure and operation which shall avail adequate power for such areas.

Such power generating apparatus in accordance with the teachings of the prior art depends on the thermoelectric effect for its operation. Heating means, typically a radioactive or fissionable source, and a heat sink or cooling means, typically water, ice or snow in the area are provided. The hot junction of a thermopile is subjected to the heating means and the cold junction to the cooling means and an attempt is made to use the output of the pile. This apparatus has the disadvantage that the output voltage of each thermocouple is small and its resistance is high so that the power available is limited. Reduction of the resistance of the couples demands that the generating apparatus be bulky and excessively costly.

It is then an object of this invention to overcome the difficulties of the prior art. Another object of this invention is to provide reliable, adequate power generating apparatus of relatively low cost, particularly for areas having no power-supply facilities.

In accordance with this invention in its specific but most important aspects, electrical power is derived preferably by magnetic induction from the movement of a thermally-actuable means, such as a bimetallic element, subjected to a heat source and a heat sink. The thermally-actuable means is mounted to move between the source and the sink between a position in which it is in heat-exchange relationship with the source and a position in which it is in heat-exchange relationship with the sink. It is an important feature of this invention that the thermally-actuable means is snap acting so that the movement producing the magnetic induction has a high velocity and high voltages are induced. To achieve the snap action a snap acting bimetallic element, for example a Klixon bimetal, may be used or an ordinary bimetal may act through a toggle link.

The movement of the thermally actuable means produces impulses of alternating polarity at irregular intervals. The impulses may be supplied to storage means, for example a capacitor. The capacitor may be charged through a rectifier and may charge a battery.

In accordance with a modification of this invention power may be derived continuously by operation of an impact-actuable means for producing periodic mechanical motion such as a tuning fork. The impacts for actuating this means may be applied by the thermally-actuable means during its movement.

In accordance with a further modification of this invention the energy of movement of the thermally-actuable means may be stored in a spring. The spring may produce continuous rotation of a rotor of a generator through an escapement.

Figure 2:
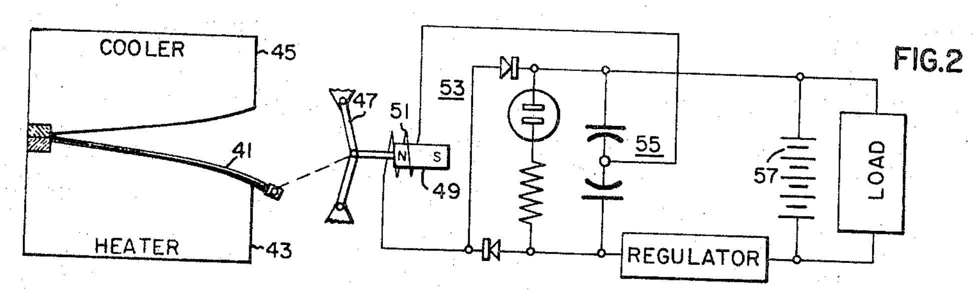
Figures 3, 4:
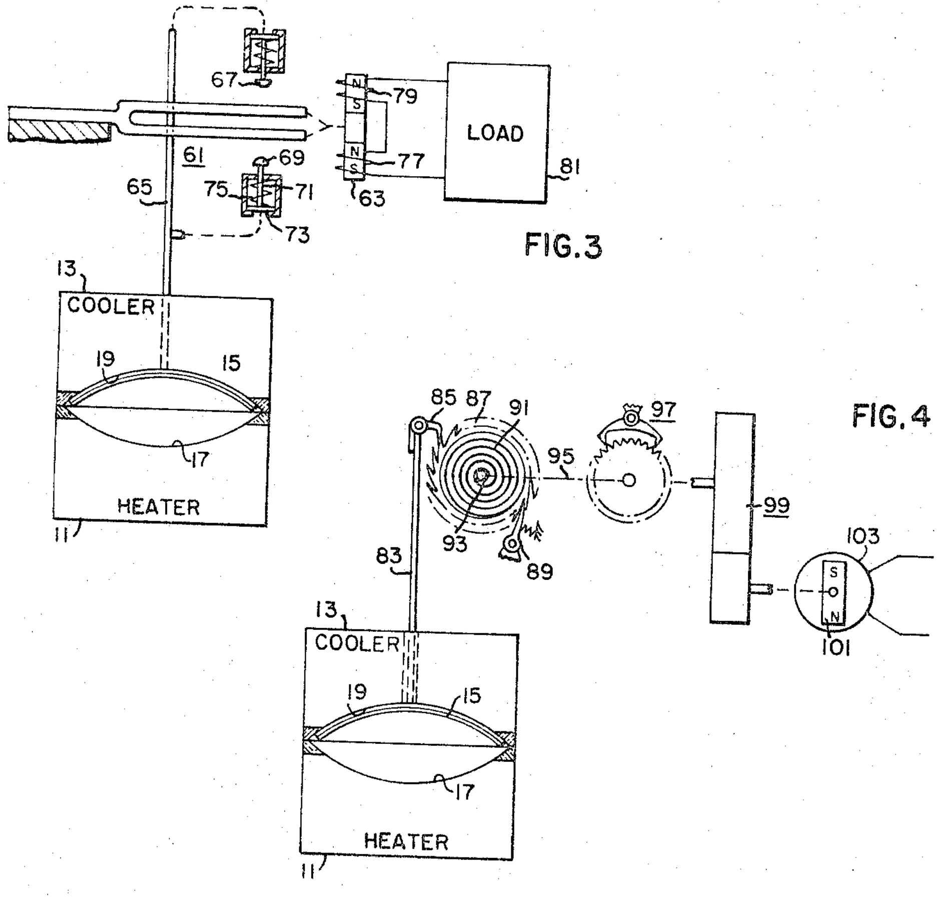

The novel features considered characteristic of this invention are disclosed generally above. For a better understanding of this invention both as to its organization and as to its method of operation, together with additional objects and advantages thereof, reference is made to the following description of specific embodiments taken in connection with the accompanying drawings, in which:

FIGURE 1 is a drawing partly diagrammatic and partly schematic showing a preferred embodiment of this invention; and FIGS. 2, 3 and 4 are similar drawings showing modifications of this invention.

The apparatus shown in FIG. 1 includes a heater 11 and a cooler 13. The heater 11 may be of the type including a radioactive or fissionable isotope such as $Pu^{238}$, sunlight, fire or the like. The cooler 13 may be air, water or ice available in the neighborhood of the apparatus, or any other heat-absorbing medium.

This apparatus also includes a snap-type bimetal 15. The bimetal 15 is movable between a position in which it is in good heat-exchange relationship with the surface 17 of the heater 11 and a position in which it is in good heat-exchange relationship with the surface 19 of the cooler 13. The bimetal 15 carries a rod 21 from which a magnet 23 is suspended. The magnet 23 should be of a material capable of producing high magnetic flux.

When the bimetal 15 is in heat-exchange relationship with the heater 11, it is heated and ultimately snaps to the position in which it is in heat-exchange relationship with the cooler 13. Here it is cooled and ultimately snaps back. As the bimetal 15 snaps back and forth, it moves the magnet 23 back and forth. The magnet is mounted to move through a coil 25 so that its magnetic lines of force are cut by the coil. Alternating current is then induced in the coil 25.

The positions of the coil 25 and magnet 23 may be reversed. The rod 21 may carry the coil back and forth in the field of a fixed magnet. The coil may be connected to brushes or flexible wire for deriving power.

The apparatus includes a capacitor 27 and a rectifier 29. The capacitor 27 is connected to be charged by the alternating current from the coil 25 through the rectifier 29.

The apparatus also includes a storage battery 31 from which a load 33 is supplied.

The capacitor 27 is connected to charge the battery 31 through a regulator 35. The regulator 35 may be of any suitable type. For example, it may be of the relay type presently used in automobiles or of the semi-conductor or electronic type including the usual transistor or controlled-silicon rectifiers or electronic-tube regulating circuits.

To prevent the capacitor voltage from becoming excessive a regulator tube (or tubes) 37 may be connected through a protective resistor 39 across the capacitor 27.

In the use of the apparatus capacitor 27 is charged by the alternating current produced by the movement of the bimetal 15 and maintains the battery 31 charged for use at all times.

In the apparatus shown in FIG. 2, the bimetal 41 is of the ordinary flexing type. This bimetal 41 is mounted in intimate heat-exchange relationship between a heater 43 and a cooler 45. The free end of the bimetal 41 is connected to snap a toggle link 47 from one of its positions to the other as the bimetal moves from heat-exchange relationship with the heater 43 to heat-exchange relationship with the cooler 45. The toggle link 47 is connected to move a magnet 49 in and out of a coil 51. The output of the coil is supplied through a rectifier 53 to charge capacitor 55. The capacitor 55 may be connected to a storage battery 57 in the same manner as capacitor 27.

The apparatus shown in FIG. 3 includes a heater 11 and a cooler 13 and a bimetallic element 15 of the snap type as shown in FIG. 1 cooperative with heating surface 17 and cooling surface 19. This apparatus also includes a tuning fork 61 fixed at the handle and carrying a magnet 63 suspended from its tips. A bar 65 extends from the bimetallic element 15. This bar carries buttons 67 and 69. Each button 67 and 69 extends from a stud 71 having a flange 73 at its end. The button is held retracted in the tip of the rod from which it is suspended by a spring 75.

On the abrupt movement of the element 15 one button 67 or 69 is momentarily projected against the fork 61 to cause it to vibrate. Button 67 strikes one arm of the fork when the element 15 moves from the cooler 13 to the heater 11 and button 69 strikes the fork 61 when the element 15 moves in the opposite direction. In each case the button is retracted into the corresponding end of the rod 65 after it strikes and does not damp the vibrations of the fork. The frequency of operation of the element 15 may be set at a sub-multiple of the frequency of the fork 61 so that the amplitude of vibration of the fork is maximized.

The poles of the magnet 63 are coupled to coils 77 and 79 and induce current in the coils. The coils 77 and 79 are connected in additive relationship to the load 81.

The apparatus shown in FIG. 4 includes a heater 11, a cooler 13 and a bimetallic element 15 similar to that of FIG. 1. The element 15 is provided with a rod 83 which carries a pawl 85 that drives a ratchet 87 on movement of the element 15 from the cooler 13 to the heater 15. The ratchet 87 is held in each position by a holding pawl 89. While not shown, a pawl operating through a linkage may be provided for advancing the ratchet 87 when the element 15 moves the heater 11 to the cooler 13.

The ratchet 87 is connected to a spiral spring 91 so that as it is rotated it winds the spring 91 about a fixed axis 93. The spring 91 is connected to rotate a shaft 95 through an escapement mechanism 97 at a constant speed. The shaft 95 is connected through speed multiplying gearing 99 to the rotor 101 of a generator 103. Power may be derived from the generator 103.

While a preferred embodiment of this invention has been disclosed herein, many modifications thereof are possible. This invention then is not to be restricted except insofar as is necessitated by the spirit of the prior art.

I claim as my invention:

1. Electric-power generating apparatus including heating means, cooling means, a bimetallic element of the snap-action type mounted to snap back and forth between a position where it is in heat-exchange relationship with said heating means and a position where it is in heat-exchange relationship with said cooling means as it is heated and cooled respectively by said heating and cooling means, means connected to said element inducing electrical current on said snapping of said element, and electrical-energy storage means connected to said inducing means to store the energy of said electrical currents produced thereby.

2. Electric-power generating apparatus including heating means, cooling means, thermally-actuable means of the snap-action type mounted to snap back and forth between a position where it is in heat-exchange relationship with said heating means and a position where it is in heat-exchange relationship with said cooling means as it is heated and cooled respectively by said heating and cooling means, means connected to said thermally actuable means inducing electrical current on said snapping of said thermally-actuable means, and electrical-energy storage means connected to said inducing means to store the energy of said electrical currents produced thereby.

3. Power generating apparatus including heating means, cooling means, means thermally actuable to produce mechanical movement mounted to move mechanically back and forth between a position where it is in heat-exchange relationship with said heating means and a position where it is in heat-exchange relationship with said cooling means, as it is heated and cooled respectively by said heating and cooling means, means actuable by mechanical force to produce sound waves, and means connected to said thermally-actuable means for subjecting said sound-wave producing means to said mechanical force to produce said sound waves.

4. Power generating apparatus including heating means, cooling means, snap acting means thermally actuable to produce abrupt mechanical movement mounted to snap mechanically back and forth between a position where it is in heat-exchange relationship with said heating means and a position where it is in heat-exchange relationship with said cooling means, as it is heated and cooled respectively by said heating and cooling means, means actuable by mechanical impact to produce sound waves, and means connected to said thermally-actuable means for subjecting said sound-wave producing means to mechanical impacts to produce said sound waves.

5. Power generating apparatus including heating means, cooling means, means thermally actuable to produce mechanical movement mounted to move mechanically back and forth between a position where it is in heat-exchange relationship with said heating means and a position where it is in heat-exchange relationship with said cooling means, as it is heated and cooled respectively by said heating and cooling means, means actuable by a mechanical impact to produce periodic mechanical motion, means connected to said thermally-actuable means for subjecting said impact-actuable means to repeated impacts as said thermally actuable means moves back and forth, and means responsive to said impact actuable means for converting said mechanical motion into electrical energy.

6. Power supply apparatus for supplying power to a load including heating means, cooling means, means thermally actuable to produce mechanical movement mounted to move mechanically back and forth between a position where it is in heat-exchange relationship with said heating means and a position where it is in heat-exchange relationship with said cooling means, as it is heated and cooled respectively by said heating and cooling means, means actuable by a mechanical impact to produce periodic mechanical motion, means connected to said thermally-actuable means for subjecting said impact-actuable means to repeated impacts as said thermally actuable means moves back and forth, and means responsive to said impact-actuable means for converting the mechanical motion thereof into electrical energy.

7. Power generating apparatus including heating means, cooling means, means thermally actuable to produce mechanical movement mounted to move mechanically back and forth between a position where it is in heat-exchange relationship with said heating means and a position where it is in heat-exchange relationship with said cooling means, as it is heated and cooled respectively by said heating and cooling means, a tuning fork, means connected to said thermally-actuable means for subjecting said tuning fork to repeated mechanical impacts to cause said tuning fork to vibrate continuously as said thermally actuable means moves back and forth, and means responsive to said tuning fork for coverting the vibration of said fork into electrical energy.

References Cited

UNITED STATES PATENTS

| | | | |
|---|---|---|---|
| 1,951,446 | 3/1934 | Scheibell | 60—23 |
| 2,468,996 | 5/1949 | Olson | 60—23 X |
| 2,572,162 | 10/1951 | Koonz | 60—23 X |
| 2,850,870 | 9/1958 | Martin | 60—23 |
| 2,900,592 | 8/1959 | Baruch | 290—1 X |
| 3,013,381 | 12/1961 | Parsons | 60—23 |
| 3,076,098 | 1/1963 | Golvill | 290—1 |
| 3,102,205 | 9/1963 | Combs | 310—15 X |
| 3,152,554 | 10/1964 | Kofink | 60—23 X |

ORIS L. RADER, *Primary Examiner.*
G. SIMMONS, *Assistant Examiner.*